Dec. 26, 1922.
C. L. KINDER ET AL.
OIL TUBE FOR MOTOR VEHICLE ENGINES.
FILED SEPT. 26, 1921.
1,440,156
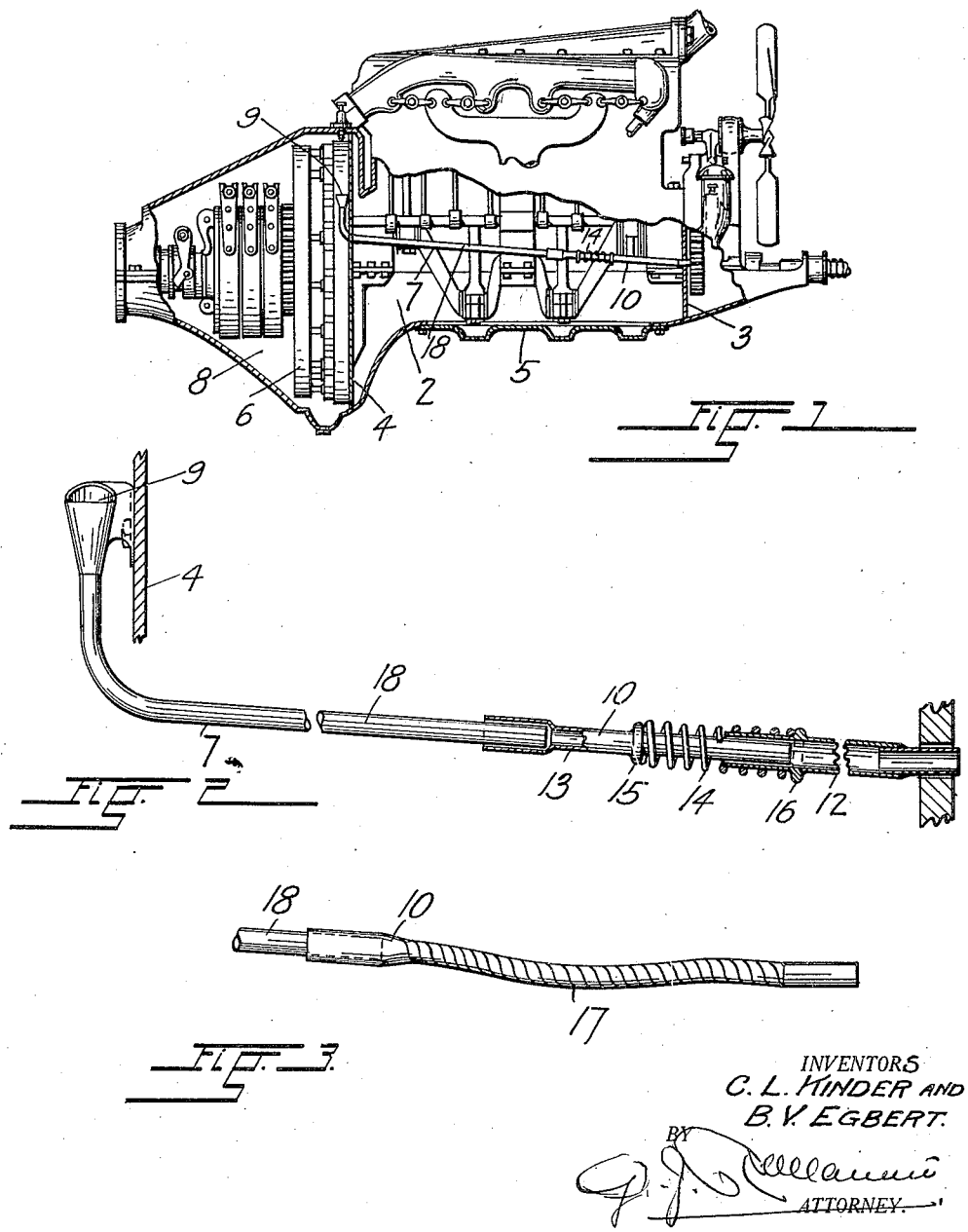
INVENTORS
C. L. KINDER AND
B. V. EGBERT.
BY
ATTORNEY.

Patented Dec. 26, 1922.

1,440,156

UNITED STATES PATENT OFFICE.

CLOYD L. KINDER, OF FORT LUPTON, AND BENJAMIN V. EGBERT, OF HENDERSON, COLORADO.

OIL TUBE FOR MOTOR-VEHICLE ENGINES.

Application filed September 26, 1921. Serial No. 503,472.

*To all whom it may concern:*

Be it known that we, CLOYD L. KINDER and BENJAMIN V. EGBERT, citizens of the United States, residing at Fort Lupton, in the county of Weld and State of Colorado, and at Henderson, in the county of Adams and State of Colorado, respectively, have invented certain new and useful Improvements in Oil Tubes for Motor-Vehicle Engines, of which the following is a specification.

This invention relates to improvements in a lubricating system for motor driven vehicles and more particularly to improvements in the conduit which in certain makes of automobiles, the Ford in particular, conveys a lubricant from the crank case of the power plant to the shaft bearings at the forward end thereof.
The conduit usually consists of a slantingly disposed tube which at one end has a funnel shaped orifice to receive a quantity of the oil displaced by the revolving motion of the fly wheel of the engine, and which at its opposite end passes through an opening in the front wall of the crank case and connects with the bearings exteriorly of the same. It frequently occurs that the tube, which is of small diameter, becomes clogged by foreign matter in the lubricant and it is customary to remove the same by air pressure applied at the discharge end of the tube by connecting it with a convenient source of supply such as the air line found in public garages.

In order to gain access to the discharge end of the tube for its connection with the air conduit, it has heretofore been necessary to partially dismantle the power plant of the vehicle by removal of the radiator, fan, commutator, gear cover, gears and other parts.

It is evident that this method of clearing the oil tube of obstructive matter is costly in that it requires a considerable length of time to remove and replace the several machine parts, and it is the principal object of the present invention to avoid this work by providing a construction which permits of the attachment of an air line at the end of the tube, within the crank case of the engine.

We attain this object by making the end portion of the tube at which it engages with the wall of the crank case, adjustable with relation to the body portion of the same, whereby to render its end accessible inside the crank case after the bottom pan thereof has been removed, for the ready attachment of the air line usually found in public garages or the tube of an airpump should another source of air under pressure not be available.

An embodiment of our invention has been illustrated in the accompanying drawings in the various views of which like parts, are similarly designated and in which—

Figure 1 is a sectional elevation of the power plant of a motor vehicle of the Ford type, showing the oil tube constructed in accordance with the present invention;

Figure 2, a sectional and fragmentary elevation of the oil tube drawn to an enlarged scale; and Figure 3, an elevation of the portion of the tube at the discharge end of the same showing a modification in the construction of our improvement.

Referring first to Figures 1 and 2 of the drawings, the reference character (2) designates the crank case of the vehicle engine, including a front wall (3), a rear wall (4), and a removable bottom pan (5).

Situated exteriorly of the rear wall of the case is the fly wheel (6), connecting with the crank shaft of the engine, and placed forward of the front wall of the same, are the bearings of the engine and cranking shafts, and the timing mechanism of the plant. The oil tube (7), by which the forward bearings are supplied with a lubricant from the casing (8) of the engine rearward of the crank case proper, is supported in openings in the two walls above referred to in a forwardly slanting position, and the portion of the tube exteriorly of the rear wall is bent upwardly and terminates in a funnel shaped mouth (9) to receive a portion of the oil carried upwardly by the rotary movement of the fly wheel from the bottom of the casing in which the latter is enclosed.

The opposite end of the tube extending in the opening of the front wall of the crank case, terminates adjacent the before mentioned bearings to convey thereto the lubricant which entered the mouth at the rear end of the tube as hereinbefore described. The tube constructed in accordance with the present invention has its discharge end portion mounted movably with relation to its body portion so that it may be separately withdrawn from the opening in which it is normally disposed.

In the construction illustrated in Figures 1 and 2 the movable portion (10), of the tube is composed of two telescoping members (12 and 13) which are contractibly connected by a coiled spring (14) engaging between circumferential shoulders (15 and 16). The forward end portion of the member (12) is reduced in diameter and bent upwardly to fit within the opening of the front wall and the opposite end of the other member (13) is slightly enlarged to receive the end of the body portion (18) of the tube.

In the operation of my invention, when it is designed to clean the oil tube by air pressure, the bottom pan of the crank case is removed and the member of the movable section of the tube is moved lengthwise upon the other member against the pressure of the spring until its end is completely withdrawn from the opening in the front wall of the crank case in which it is normally disposed.

A conduit connected with a source of air under pressure may then be attached to the end of the contractible section of the oil tube or the section can be removed from the stationary body portion of the tube and the air line attached at the end thereof.

In the modified construction illustrated in Figure 3, the contractible part of the oil tube is made of a piece of flexible metal tubing (17) which is detachably connected at the end of the body portion of the tube as in the first described construction.

Having thus described our improved oil tube, we desire it understood that other changes in the construction and arrangement of the parts thereof may be resorted to within the spirit and scope of our invention as defined in the hereunto appended claims.

What we claim and desire to secure by Letters Patent is:

1. In a lubrication system of motor vehicle engines, the combination with the crankcase of the engine, of an oil tube composed of two end-to-end connected sections, one of which is fixed in the crank case and the other of which has its end extending loosely in an opening of the same, the last mentioned section being contractible to remove its end from said opening for the attachment of an air line.

2. In a lubrication system of motor vehicle engines, the combination with the crankcase of the engine, of an oil tube composed of two end-to-end connected sections, one of which is fixed in the crank case and the other of which has its end extending loosely in an opening of the same, the last mentioned section being movable with relation to the fixed section to remove its end from said opening for the attachment of an air line.

3. In a lubrication system of motor vehicle engines, the combination with the crankcase of the engine, of an oil tube composed of two end-to-end connected sections one of which is fixed in the crank case and the other of which has its end extending loosely in an opening of the same, the last mentioned section being longitudinally adjustable with relation to the fixed section to remove its end from said opening for the attachment of an air line.

4. In a lubrication system of motor vehicle engines, the combination with the crankcase of the engine, of an oil tube composed of two end-to-end connected sections, one of which is fixed in the crank case and the other of which has its end extending loosely in an opening of the same, the last mentioned section being adjustable for the removal of its end from said opening, and removable with relation to the fixed section for the direct attachment of an air line to the tube.

5. The combination with the crank case of a motor vehicle engine, of an oil tube comprising a relatively fixed body section in end-to-end connection therewith and a longitudinally contractible end section.

6. The combination with the crank case of a motor vehicle engine, of an oil tube comprising a relatively fixed body section and a longitudinally contractible section removably connected at an end thereof.

7. The combination with the crank case of a motor vehicle engine of an oil tube comprising a relatively fixed body section, and a contractible section at an end thereof, composed of yieldingly connected telescoping members.

8. An oil tube for motor vehicle engines comprising a body section and a contractible section at an end thereof, composed of telescoping members, and a spring between said members.

In testimony whereof we have affixed our signatures.

CLOYD L. KINDER.
BENJAMIN V. EGBERT.